US009286799B2

(12) United States Patent
Christianson et al.

(10) Patent No.: US 9,286,799 B2
(45) Date of Patent: Mar. 15, 2016

(54) VEHICLE BARRIER CONTROL WITH PERFORMANCE DATA

(75) Inventors: Joel Curtis Christianson, Corcoran, MN (US); Bryan L. Peterson, Balsam Lake, WI (US)

(73) Assignee: Cinch Systems, Inc., St. Michael, MN (US)

( * ) Notice: Subject to any disclaimer, the term of this patent is extended or adjusted under 35 U.S.C. 154(b) by 1068 days.

(21) Appl. No.: 13/372,372

(22) Filed: Feb. 13, 2012

(65) Prior Publication Data

US 2013/0211784 A1 Aug. 15, 2013

(51) Int. Cl.
*G06F 15/00* (2006.01)
*G08G 1/07* (2006.01)

(52) U.S. Cl.
CPC ........................................ *G08G 1/07* (2013.01)

(58) Field of Classification Search
USPC .......................................... 702/183, 184, 185
See application file for complete search history.

(56) References Cited

U.S. PATENT DOCUMENTS

2002/0170685 A1* 11/2002 Weik et al. .................... 160/133

* cited by examiner

*Primary Examiner* — Mohamed Charioui
(74) *Attorney, Agent, or Firm* — Schwegman Lundberg & Woessner, P.A.

(57) ABSTRACT

A method and system include a switch to provide power to a vehicle barrier, A logic based controller is coupled to the switch, and an input device coupled to the logic based controller. A sensor is coupled to the vehicle barrier to provide vehicle barrier performance and maintenance data. The maintenance data may be used to identify maintenance activities to be performed prior to failure of the vehicle barrier.

17 Claims, 5 Drawing Sheets

VEHICLE BARRIER CONTROL WITH PERFORMANCE DATA

BACKGROUND

Vehicle barrier controllers historically have included a switch to control power to a piston or other device to raise or lower a barrier. The barrier may be a wall or cylinder that rises up from a chamber in a roadway to block a vehicle, or may be an arm type of gate that swings down or slides across the roadway to block a vehicle. Other barriers may operate in further different ways. The switch may be coupled to a mechanical button to be operated by a person, who is in a position to observe the roadway and barrier and make decisions on whether or not to allow vehicles to pass.

SUMMARY

A method and system utilize a switch to provide power to a vehicle barrier. A logic based controller is coupled to the switch. An input device is coupled to the logic based controller. A sensor is coupled to the vehicle barrier to provide maintenance data. The maintenance data is used to identify maintenance activities to be performed prior to failure of the vehicle barrier.

DETAILED DESCRIPTION

Figure 1:
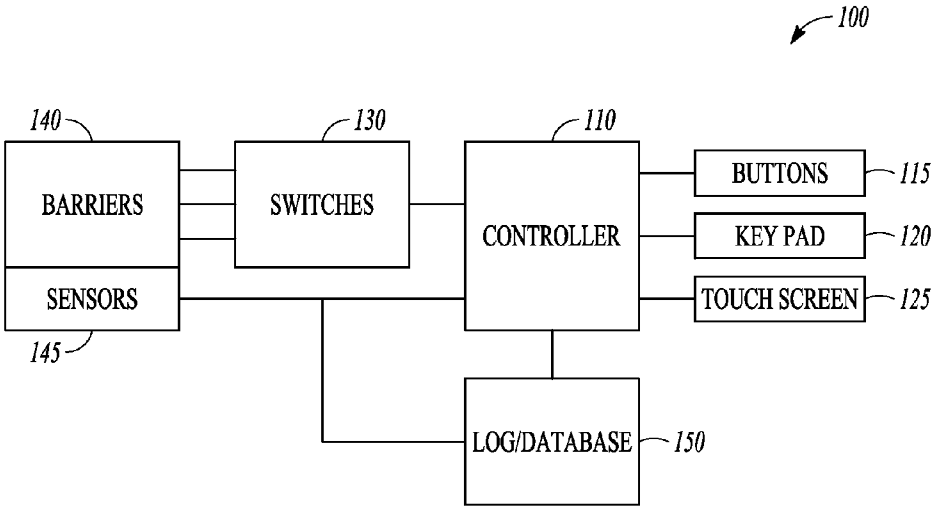
FIG. 1 is a block diagram of a vehicle barrier system with a logic based controller according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A logical controller of vehicle barriers may receive barrier control commands from different types of input devices such as manual push buttons, keyboards, keypads, and touch screens. The input is then processed by algorithms in the logic and used to control physical switches to control one or more vehicle barriers. Sensors may also be used to provide data regarding hydraulic cylinder pressures, voltages, and temperatures. The controller tracks life cycle and environment details in the form of a history file stored in a database such that each barrier has individual details of its operation and environment. The history file information may be used to predict appropriate times for maintenance and replacement to be scheduled prior to failure, saving time and money.

In some embodiments, current sensed information may be used to determine whether operation of the vehicle barrier is within predefined parameters. For example, if ambient temperature is low, information indicating that the barrier is moving slowly, may not be an indication of a malfunction, but rather may be within normal operating parameters at that temperature. At the same time, the temperature and number of times the barrier is operated at that temperature may affect the prediction for maintenance. Too low or too high a temperature may add stress to pistons. By using the information in the history file, maintenance may be predicted more accurately.

In further embodiments, operation of multiple barriers may be linked logically together. As control inputs are received, they are processed by an algorithm to determine which barriers to actuate. For example, if there is a three lane road, and three barriers in parallel controlling access to the lanes, they may all be controlled by activation of a single button. The single switch may be specifically programmed to operate all three. In some examples, each barrier may have a separate button, but pressing any of the three buttons causes all three barriers to operate in unison.

Many different logical associations of buttons and barriers may be made. In some embodiments, a button may be logically tied to two barriers separated from each other at different distances along a road. Actuation of a button may cause the barriers to allow a vehicle to travel past a first barrier prior to both barriers rising to trap the vehicle between the barriers. Many other different logical associations may be formed, including prioritization of buttons such that a high priority button may block a lower priority button from causing operation of the barrier.

FIG. 1 is a block diagram of a vehicle barrier control system indicated generally at 100. A controller 110 includes logic for processing input from one or more input devices indicated at 115, 120, and 125. Input device 115 may be a mechanical button. Input device 120 may be a keypad or keyboard. Input device 125 may be a touchpad that can have multiple buttons that can be pressed. There may be multiple of each of the different types of input devices in various embodiments, including mobile computers, smart phones, or stationary computers, or just many of one type in further embodiments.

One or more of the input devices can be logically associated by the controller with one or more switches 130 that operate one or more vehicle barriers 140. Vehicle barrier 140 may be any type of vehicle barrier, such as an arm that rotates up from an indentation in a road, an arm that rotates down from a raised position, a wall or a piston that rises vertically from a cavity or storage cylinder in the road. Further types of vehicle barriers may also be used.

The one or more barriers 140 are monitored by multiple sensors 145. Sensors 145 in various embodiments may measure different environmental and performance parameters associated with each of the barriers 140. Ambient temperature and humidity may be measured in one embodiment. Piston hydraulic pressure, voltage, and temperature may be measured in further embodiments. Different parameters may be measured as a function of data desired for performing predictive maintenance algorithms via controller 110. The sensor data may be provided directly to controller 110, or to a log/database 150 that is also coupled to controller 110 in some embodiments. The stored sensor data in one embodiment is associated with each of the corresponding barriers, and may be used by predictive maintenance algorithms to determine when to repair or replace components of the vehicle barriers.

In some embodiments, the predictive maintenance algorithms may be based on number of operating cycles of the barrier weighted by ambient conditions and operating conditions that are sensed, such as the hydraulic piston pressures, voltages, and temperatures. If any of the parameters appear to be heading toward an out of normal range, maintenance operators may be alerted, allowing maintenance to be scheduled at a convenient time. Such predictions can help eliminate down time of barriers while parts are being ordered, or may help optimize inventory management. In further embodiments, the measured parameters may be compared to known patterns to determine whether a barrier will need maintenance, as well as to help identify the exact maintenance that will be needed. The manufacturer of barriers may specify certain parameters to measure and correlate to maintenance actions in some embodiments.

Figure 2:
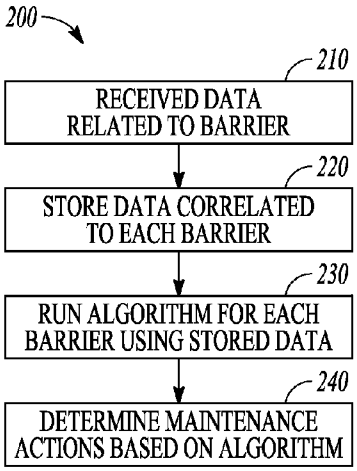
FIG. 2 is a flow diagram illustrating a method performed by a logic based controller according to an example embodiment.

A computer executable method 200 of predicting maintenance for a vehicle barrier is illustrated in flowchart form in FIG. 2. At 210, data from sensors and from the controller that causes actuation of the sensor is received, and stored at 220 such that corresponding data for each barrier is logged and available. The controller thus increments the number of cycles for each barrier as it is cycled between an unblocking and blocking state. At 230, a predictive maintenance algorithm is executed, such as by controller 110 or other device capable of executing the algorithm for each barrier based on the stored or logged data. A central controller may be used in some embodiments to query the database 150 to obtain information about each barrier. At 240, the algorithm determines whether maintenance is needed for each barrier, and may determine the maintenance actions that are needed. The maintenance may be scheduled and parts ordered such that the parts are available when and where needed. If done appropriately, the barrier may be maintained prior to failure, reducing potential down time of the barrier and avoiding rush maintenance activities that may increase costs of maintenance.

Figure 3:
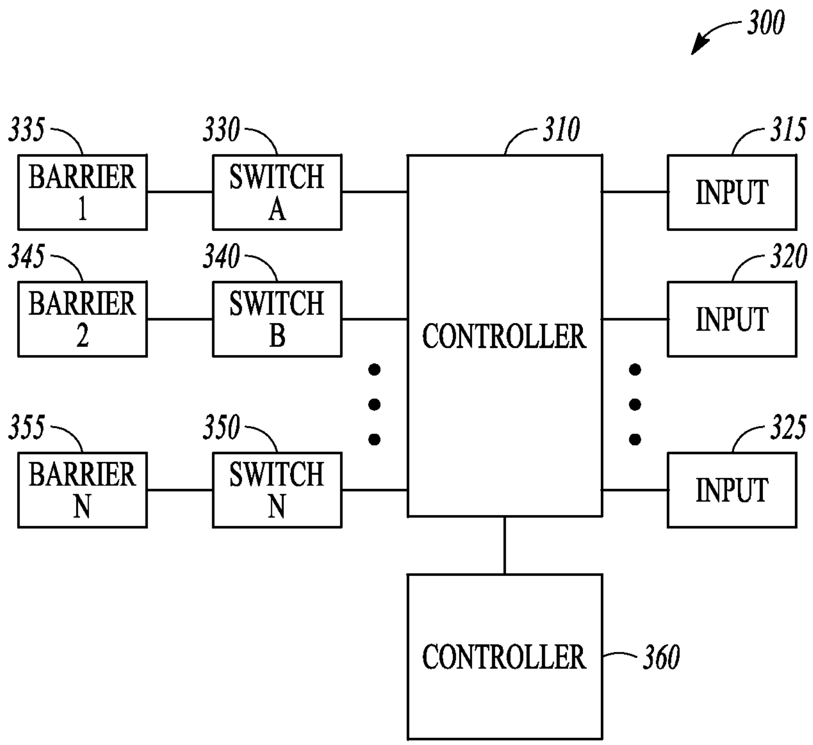
FIG. 3 is a block diagram of an alternative system for controlling multiple vehicle barriers according to an example embodiment.

FIG. 3 is a block diagram of an alternative vehicle barrier control system indicated generally at 300. A controller 310 includes logic for processing input from one or more input devices indicated at 315, 320, and 325. Input device 315 may be a mechanical button. Input device 320 may be a keypad or keyboard. Input device 325 may be a touchpad that can have multiple buttons that can be pressed.

One or more of the input devices can be logically associated with a switch A at 330 to control a vehicle barrier 335. Vehicle barrier 335 may be any type of vehicle barrier, such as an arm that rotates up from an indentation in a road, an arm that rotates down from a raised position, or a piston that rises vertically from a storage cylinder in the road. Further types of vehicle barriers may also be used. Further input devices may be coupled to a switch B at 340 and barrier B at 345. Several other switches up to switch N at 350 and associated barrier N at 355 may be used in various embodiments.

In one embodiment, one of the switches or inputs may be a key actuated switch, referred to as a RCP switch, that is associated with one or more input devices. When the switch is turned on by the key, it may block input signals from reaching the controller 310, or may otherwise inform the controller 310 to ignore input from the associated input devices. In one embodiment, actuation of the switch 350 by the key causes a message to be sent via the controller to the associated inputs to cause them to not send signals when actuated. The inputs may also have lights, such as LED lights that are turned off to indicate to a user that the input is inactive.

In one embodiment, a further controller 360 may be coupled to controller 310. The further controller 360 may be a central controller, or an intermediate controller that serves as a backup controller should controller 310 become compromised.

Figure 4:
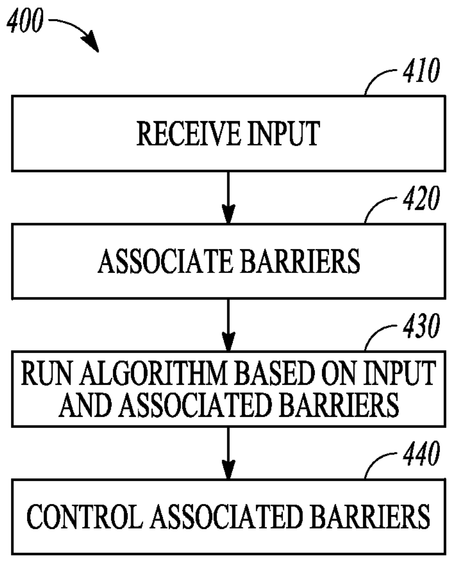
FIG. 4 is a flow diagram illustrating a method 400 of logically associating vehicle barriers for control according to an example embodiment.

FIG. 4 is a flow diagram illustrating a method 400 of logically associating vehicle barriers for control according to an example embodiment. An input, such as a user command is received at 410. The input may also be generated by sensing devices or some other automated command generation method, such as may be caused by a schedule or other event. At 420, information regarding associated barriers is obtained. Such associations may be pre-programmed in some embodiments, or selected by a user. In some embodiments, the barriers may be associated by a command, such as by selection of a user interface that is pre-configured to control multiple barriers. At 430, an algorithm is run on the input and utilizes the associated barrier information to determine which barriers to actuate responsive to the command. Finally, at 440, a control function is implemented on the associated barriers. The control function may cause actuation of the barriers, such as raising or lowering the barriers in sequence or simultaneously.

Figure 5:
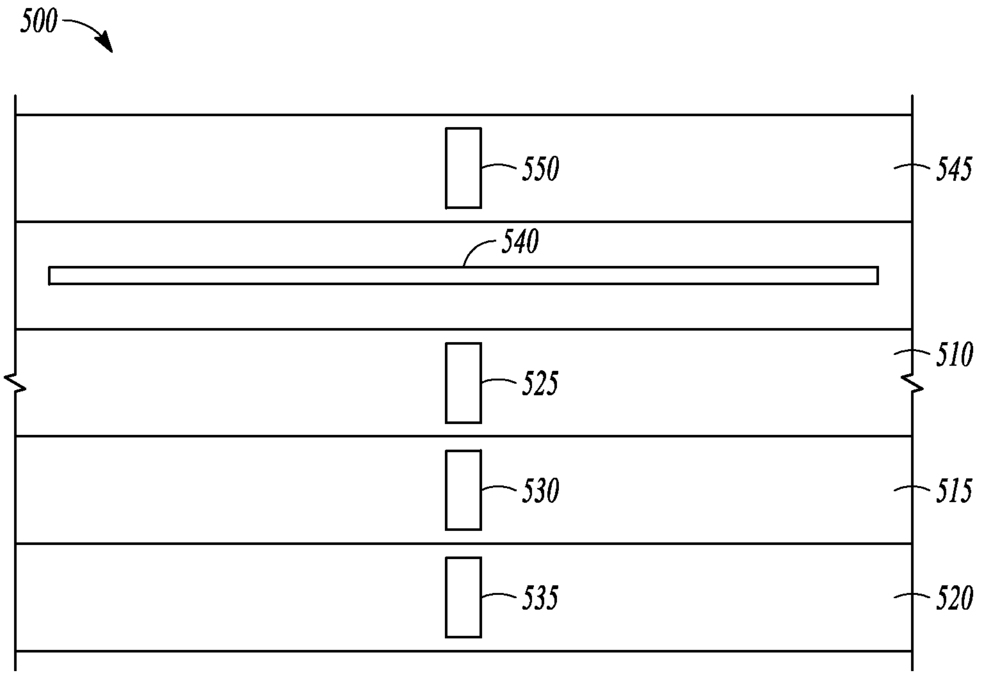
FIG. 5 is a top view block representation of a physical arrangement of multiple vehicle barriers that may be logically associated according to an example embodiment.

FIG. 5 is a top view block representation 500 of multiple vehicle barriers that may be logically associated according to an example embodiment. Three lanes 510, 515, and 520 of a road are illustrate with three vehicle barriers 525, 530, and 535 disposed in the respective lanes to control vehicle access. In order to control access via the road, all three barriers should be operated in unison, unless there are other fixed or moveable barriers preventing vehicles from changing lanes to drive around a barrier. One example of a fixed barrier is illustrated at 540, separating a further lane 545 from the set of three lanes 525, 530, and 535. Lane 545 also has a single barrier 550 that may be independently controlled, or optionally lined to control of barriers 525, 530, and 535 as a logical group of barriers.

In one embodiment, the controller may operate to control the three barriers together in the event that a command is received relating to any single barrier 525, 530, 535. A command may also specifically be associated with all three barriers, and results in the same control actions taken on each. In further embodiments, one may associate any of the barriers with a command for one of the lanes. For instance, a command to control barrier 535 may be programmed to cause both barriers 535 and 530 to actuate, but not barrier 525. These different programs may be based on the physical arrangement of lanes and barriers combined with security goals. As can be seen, the use of logical controllers and logical associations of barriers provides for a quite flexible and convenient way to control barriers for many different physical arranges of lanes and barriers.

Figure 6:
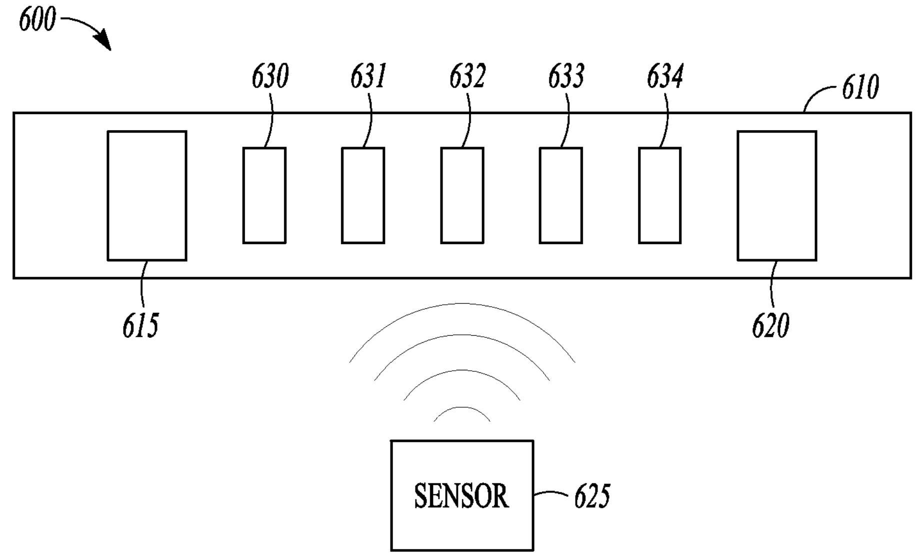
FIG. 6 is a block diagram illustrating a physical arrangement of vehicle barriers and sensors for sensing vehicle presence and controlling the vehicle barriers according to an example embodiment.

FIG. 6 is a block diagram of a physical arrangement 600 illustrating vehicle barriers and sensors for sensing vehicle presence and controlling the vehicle barriers according to an example embodiment. A vehicle lane 610 has two spaced apart vehicle barriers 615 and 620 separated by a distance suitable to trapping a vehicle between them. The distance should be long enough that given expected vehicle speeds, there is sufficient time to decide whether to trap the vehicle between barriers and allow enough time to raise the barriers after a vehicle passes one of the barriers and is still between both barriers. A plurality of sensors 630, 631, 632, 633, 634, such as pressure sensors, magnetic sensors or other sensors suitable for detecting the presence of a vehicle may be embedded in the lane. In addition, a motion sensor 625 may be positioned adjacent the lane 610 to provide further information about the position of the vehicle in the lane. The sensors may be coupled to a controller as previously described to provide vehicle position information to the controller, allowing actuation of the vehicle barriers to trap the vehicle between the barriers. In one embodiment, a command may be provided to instruct the controller to automatically detect and trap vehicles between the barriers. Further commands may provide for user control of each barrier to accomplish trapping of a vehicle. Commands may also be used to actuate one or both barriers to allow vehicles to pass, such as following a manual inspection of the vehicle.

Figure 7:
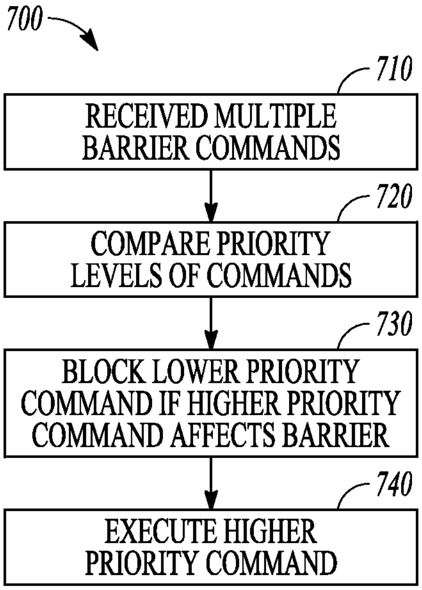
FIG. 7 is a flow diagram illustrating a method of prioritizing vehicle barrier commands according to an example embodiment.

FIG. 7 is a flow diagram illustrating a method 700 of prioritizing vehicle barrier commands according to an example embodiment. At 710, multiple barrier commands may be received, such as from different control points. Perhaps one command is received from a guard booth proximate a barrier, and another is received from a controller inside a facility that is protected by the barrier. Still another command could come from a remote central control point connected via a public or private network. Such a remote central control point could be thousands of miles from the protected facility in some embodiments. In further embodiments, additional commands may originate from a specific identified person, referred to as an entity for convenience. The person may be a supervisor or security chief in some embodiments. At 720, the commands are parsed to identify the vehicle barrier it is attempting to control and the entity from which the command was issued. This information is used to identify and compare a priority level associated with the entity. The priority level may be encoded in the command in further embodiments, with only authorized entities being able to generate commands with high priority levels. There may be two or more priority levels depending on the management structure desired.

Once the priority levels have been determined, commands of lower priority may be blocked if a command having a higher priority affects the barrier that is the subject of multiple commands as indicated at 730. Many different functions and prioritization schemes may be implemented. For instance, a command to actuate the barrier to block a vehicle may be executed unless a significantly higher priority command to allow the vehicle to pass is received. As indicated, the logic behind selecting the command to execute may be as simple as higher priority commands win and are executed as shown at 740, or perhaps if two lower priority commands indicate to block the vehicle, but a single higher priority command says to allow the vehicle to pass, the vehicle is blocked pending further commands.

Figure 8:
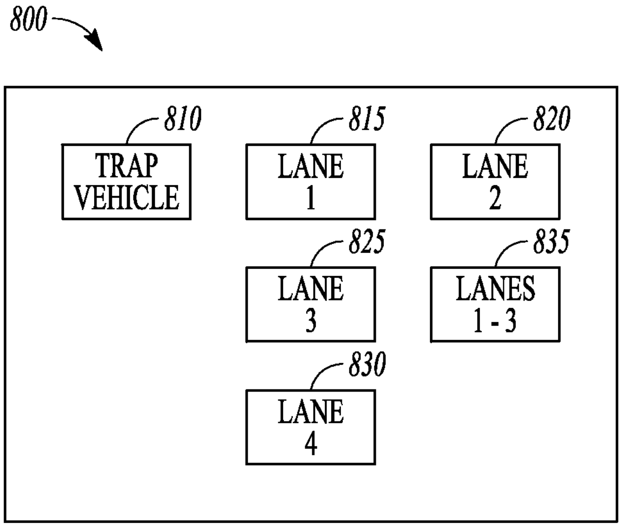
FIG. 8 is a screen shot of a user interface for a vehicle barrier control system according to an example embodiment.

FIG. 8 is a screen shot 800 of a user interface for a vehicle barrier control system according to an example embodiment. In one example the screen is a touch screen and has several touch buttons associated with commands. A trap vehicle button 810, when touched, operates to trap a vehicle between barriers. The button provide as user input command to the controller to either automatically trap a vehicle once it passes the first barrier, or may cause both barriers to actuate to a blocking position when selected. Four individual lane control buttons 815, 820, 825, and 830 are also shown. Each may operate to control the identified lane in one embodiment. In further embodiments, they may be associated with control of more than one barrier. A further button 835 is shown which controls three barriers at once when selected, corresponding to lanes 1-3. This button identifies the logical associations of barriers.

In one example, a history of pneumatic pressures in a piston used to actuate a barrier is maintained. The pressure may be slowly increasing, which can be indicative of an impending failure of a piston and the need for replacement. Certain patterns of pressure measurement may even correlate to past histories of other pistons that have failed to fairly precisely identify when the piston or other component may fail. This allows the scheduling of maintenance to replace a piston or other component prior to failure, saving potential down time and compromised protection of a facility.

Additional controller referred to as a rampart controller facilitates the creation of logical relationships between vehicle barriers. Can be used to trap a vehicle between barriers. Can tie multiple barriers together, such as a three lane with three barriers so that they can be controlled with one switch. Set up the relationship in the controller describing how the barriers should be related to each other and how they should operate. The controller also allows one to establish priority levels, such that a high priority level can block commands from a lower priority input device.

In one embodiment, input is received, data is checked and stored for history, relationships may also be checked, then the input is executed.

In one embodiment, the input devices are on a bus. This allows the ability to kill controllers that are thought to be infiltrated. Perhaps a guard booth is compromised. In this case, all user input devices in the booth can be disabled. Manual buttons may be supervised so that it is known if a wire is cut.

Adding logic on top of the switches and relays enables more complex relationships between vehicle barriers, infiltration, and maintenance tracking and history to be provided.

Figure 9:
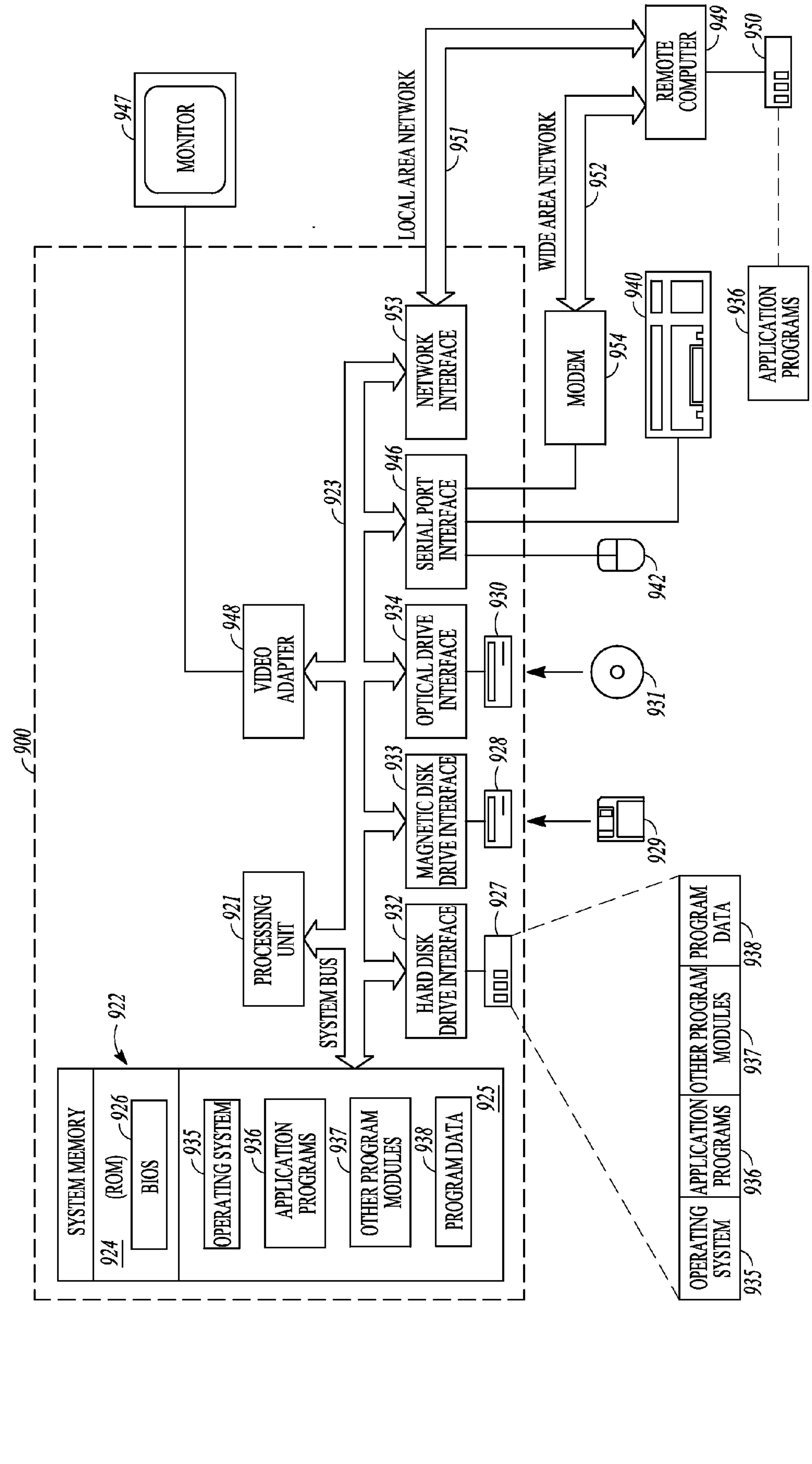
FIG. 9 is a block diagram of a specifically programmed computer system for implementing a vehicle barrier controller and executing methods according to an example embodiment.

FIG. 9 is a block diagram of a specifically programmed computer system for implementing a vehicle barrier controller and executing methods according to an example embodiment. FIG. 9 is a block diagram of a computer system to implement methods according to an example embodiment. In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; the invention is not limited to a particular type of communications device. The remote computer 949 can be another computer, a server, a router, a network PC, a client, a peer device or other common network node, and typically includes many or all of the elements described above I/O relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A system comprising:

a switch to provide power to a vehicle barrier;

a logic based controller coupled to the switch; and a sensor coupled to the vehicle barrier to provide vehicle barrier performance data including vehicle barrier movement performance, wherein the performance data provided by the sensor includes sensed ambient temperature and wherein the controller stores historical performance data including sensed ambient temperature and determines that a barrier moving more slowly than predefined parameters is still moving within normal operating parameters at the sensed temperature.

2. A system comprising:

a switch to provide power to a vehicle barrier;

a logic based controller coupled to the switch; and a sensor coupled to the vehicle barrier to provide vehicle barrier performance data including vehicle barrier movement performance, wherein the performance data includes vehicle barrier actuations, ambient temperature, and hydraulic pressure measurements.

3. The system of claim 2 wherein the controller compares a number of vehicle barrier actuations to a threshold number indicating maintenance should be performed.

4. The system of claim 3 wherein the barrier actuations are weighted such that actuations at selected environmental conditions are more heavily weighted than actuations at specified normal environmental conditions.

5. The system of claim 4 wherein the environmental conditions comprise temperature.

6. The system of claim 4 wherein the environmental conditions comprise humidity.

7. The system of claim 2 wherein the controller compares the performance data to patterns of performance data for vehicle barriers that have failed, to identify maintenance actions to be taken prior to failure.

8. A method comprising:

actuating a vehicle barrier;

receiving information generated by actuation of the vehicle barrier including vehicle barrier movement performance data; and using the information received to identify activities to maintain the vehicle barrier in operating condition, wherein the information includes vehicle barrier actuations, ambient temperature, and hydraulic pressure measurements.

9. The method of claim 8 wherein using the information to identify activities to maintain the vehicle barrier includes comparing a number of vehicle barrier actuations to a threshold number indicating maintenance should be performed.

10. The method of claim 9 wherein the barrier actuations are weighted such that actuations at selected environmental conditions are more heavily weighted than actuations at specified normal environmental conditions.

11. The method of claim 10 wherein the environmental conditions comprise temperature and humidity.

12. The method of claim 8 wherein the information is compared to historical vehicle barrier performance data to identify maintenance procedures to be performed on the vehicle barrier.

13. The method of claim 8 wherein the information is compared to patterns of historical vehicle barrier performance data for vehicle barriers that have failed, to identify maintenance actions to be taken prior to failure.

14. A computer readable storage device having stored instructions to cause a computer to execute a method, the method comprising:

actuating a vehicle barrier;

receiving information generated by actuation of the vehicle barrier including barrier movement performance information; and using the information received to identify activities to maintain the vehicle barrier in operating condition, wherein the information includes vehicle barrier actuations, ambient temperature, and hydraulic pressure measurements.

15. The computer readable storage device of claim 14 wherein the information is compared to patterns of logged historical vehicle barrier performance data for vehicle barriers that have failed, to identify maintenance actions to be taken prior to failure, and wherein using the information to identify activities to maintain the vehicle barrier includes comparing a number of vehicle barrier actuations to a threshold number indicating maintenance should be performed.

16. The computer readable storage device of claim 15 wherein the barrier actuations are weighted such that actuations at selected environmental conditions are more heavily weighted than actuations at specified normal environmental conditions.

17. The computer readable storage device of claim 16 wherein the environmental conditions comprise temperature and humidity.

* * * * *